United States Patent
Ju et al.

(10) Patent No.: US 9,912,929 B2
(45) Date of Patent: Mar. 6, 2018

(54) VIDEO FRAME PROCESSING METHOD

(71) Applicant: MEDIATEK INC., Hsin-Chu (TW)

(72) Inventors: Chi-Cheng Ju, Hsinchu (TW);
Ding-Yun Chen, Taipei (TW);
Cheng-Tsai Ho, Taichung (TW);
Chia-Ming Cheng, Hsinchu (TW);
Po-Hao Huang, Kaohsiung (TW);
Yuan-Chung Lee, Tainan (TW);
Chung-Hung Tsai, Hsin-Chu Hsien (TW)

(73) Assignee: MEDIATEK INC., Hsin-Chu (TW)

(*) Notice: Subject to any disclaimer, the term of this patent is extended or adjusted under 35 U.S.C. 154(b) by 315 days.

(21) Appl. No.: 14/221,260

(22) Filed: Mar. 20, 2014

(65) Prior Publication Data

US 2014/0285635 A1    Sep. 25, 2014

Related U.S. Application Data

(60) Provisional application No. 61/803,881, filed on Mar. 21, 2013.

(51) Int. Cl.
*H04N 13/02* (2006.01)
*H04N 13/00* (2018.01)

(52) U.S. Cl.
CPC ..... *H04N 13/0011* (2013.01); *H04N 13/0007* (2013.01); *H04N 13/0239* (2013.01); *H04N 13/0242* (2013.01); *H04N 13/0282* (2013.01)

(58) Field of Classification Search
USPC ........................................... 348/47–50
See application file for complete search history.

(56) References Cited

U.S. PATENT DOCUMENTS

| | | | |
|---|---|---|---|
| 7,170,492 B2* | 1/2007 | Bell | G06F 3/011 345/156 |
| 9,100,637 B2* | 8/2015 | Koike | H04N 13/0029 |
| 2008/0218612 A1* | 9/2008 | Border | G01S 19/45 348/262 |
| 2008/0219654 A1* | 9/2008 | Border | H04N 5/2258 396/89 |
| 2009/0115721 A1* | 5/2009 | Aull | G06F 3/017 345/156 |

(Continued)

FOREIGN PATENT DOCUMENTS

| | | |
|---|---|---|
| CN | 101627635 A | 1/2010 |
| CN | 101799939 A | 8/2010 |

(Continued)

OTHER PUBLICATIONS

"International Search Report" dated Jun. 30, 2014 for International application No. PCT/CN2014/073882, International filing date:Mar. 21, 2014.

(Continued)

*Primary Examiner* — Nigar Chowdhury
(74) *Attorney, Agent, or Firm* — Oblon, McClelland, Maier & Neustadt, L.L.P.

(57) ABSTRACT

A video frame processing method, which comprises: (a) capturing at least one first video frame via a first camera; (b) capturing at least one second video frame via a second camera; and (c) adjusting one candidate second video frame of the second video frames based on one of the first video frame to generate a target single view video frame.

13 Claims, 13 Drawing Sheets

(56) References Cited

U.S. PATENT DOCUMENTS

| | | | |
|---|---|---|---|
| 2010/0231692 A1 | 9/2010 | Perlman | |
| 2010/0309311 A1* | 12/2010 | Svanholm | G01C 15/00 |
| | | | 348/135 |
| 2012/0044327 A1* | 2/2012 | Horita | G01C 11/06 |
| | | | 348/47 |
| 2012/0147197 A1* | 6/2012 | Hjelmstrom | H04N 5/23212 |
| | | | 348/187 |
| 2012/0176481 A1 | 7/2012 | Lukk | |
| 2012/0195583 A1* | 8/2012 | Pace | G03B 35/08 |
| | | | 396/326 |
| 2013/0100255 A1 | 4/2013 | Ohba | |
| 2014/0092439 A1* | 4/2014 | Krig | G06T 9/001 |
| | | | 358/2.1 |
| 2014/0218478 A1* | 8/2014 | Lang | H04N 13/0217 |
| | | | 348/46 |

FOREIGN PATENT DOCUMENTS

| | | |
|---|---|---|
| CN | 102271269 A | 12/2011 |
| CN | 102769763 A | 11/2012 |
| CN | 102783158 A | 11/2012 |
| CN | 102892008 A | 1/2013 |
| JP | P20093507 A | 1/2009 |
| TW | 201216679 A1 | 4/2012 |
| WO | 2005120083 A1 | 12/2005 |

OTHER PUBLICATIONS

"International Search Report" dated Jun. 25, 2014 for International application No. PCT/CN2014/073857, International filing date:Mar. 21, 2014.

Chia-Ming Cheng et al., Title: Video Frame Processing Method, pending U.S. Appl. No. 14/221,229, filed Mar. 20, 2014.

\* cited by examiner

VIDEO FRAME PROCESSING METHOD

CROSS REFERENCE TO RELATED APPLICATIONS

This application claims the provisional application, which is U.S. Provisional Application No. 61/803,881, filed 2013 Mar. 21, and is included herein by reference.

BACKGROUND

Conventionally, a camera captures a frame via a camera parameter. The camera parameter can have, for example, a frame capturing parameter such as an exposure time or a frame rate. Exposure time (or named shutter speed) is the effective length of time a camera's shutter is open. Exposure time along with the aperture of the lens (also called f-number) determines the amount of light that reaches the film or an image sensor inside the camera. Long exposure time will cause image blur easily. On the contrary, short exposure time will cause image dark or noise easily. The aperture or camera sensor is always small in a camera phone (or a smartphone). When captured video frame resolution increases, the amount of light of each pixel will decrease. Therefore, it is hard to set a balanced camera parameter to generate a fine video frame.

A stereo camera is a type of camera with two or more cameras with a separate image sensor for each camera. A stereo camera is always used to generate a multi-view video frame (ex. a 3D video frame) based on the video frames generated from different cameras. Also, different camera parameters can be applied to different cameras. An electronic device with a stereo camera becomes more popular in recent years (ex. a smart phone with a stereo camera), since the user may hope he can capture a stereo image at any time he wants.

SUMMARY

Therefore, one objective of the present application is to provide a video frame processing method to generate a target single view video frame from the video frames captured by a stereo camera.

One embodiment of the present application discloses a video frame processing method, which comprises: (a) capturing at least one first video frame via a first camera; (b) capturing at least one second video frame via a second camera; and (c) adjusting one candidate second video frame of the second video frames based on one of the first video frame to generate a target single view video frame.

Another embodiment of the present application discloses: a video frame processing method, which comprises: (a) capturing at least one first video frame via a first camera utilizing a first camera parameter; (b) capturing at least one second video frame via a second camera utilizing a second camera parameter, wherein the second camera parameter is different from the first camera parameter; and (c) generating a target single view video frame corresponding to a specific time point according to the at least one first video frame, the first camera parameter and the second camera parameter.

In view of above-mentioned embodiments, the target single view video frames can be generated from video frames with different camera parameters. Therefore a better target single view video frame can be acquired.

These and other objectives of the present invention will no doubt become obvious to those of ordinary skill in the art after reading the following detailed description of the preferred embodiment that is illustrated in the various figures and drawings.

DETAILED DESCRIPTION

In the following embodiment, two cameras are taken for example to explain the concept of the present application. However, please note more than two cameras can be applied to this application.

Figure 1:
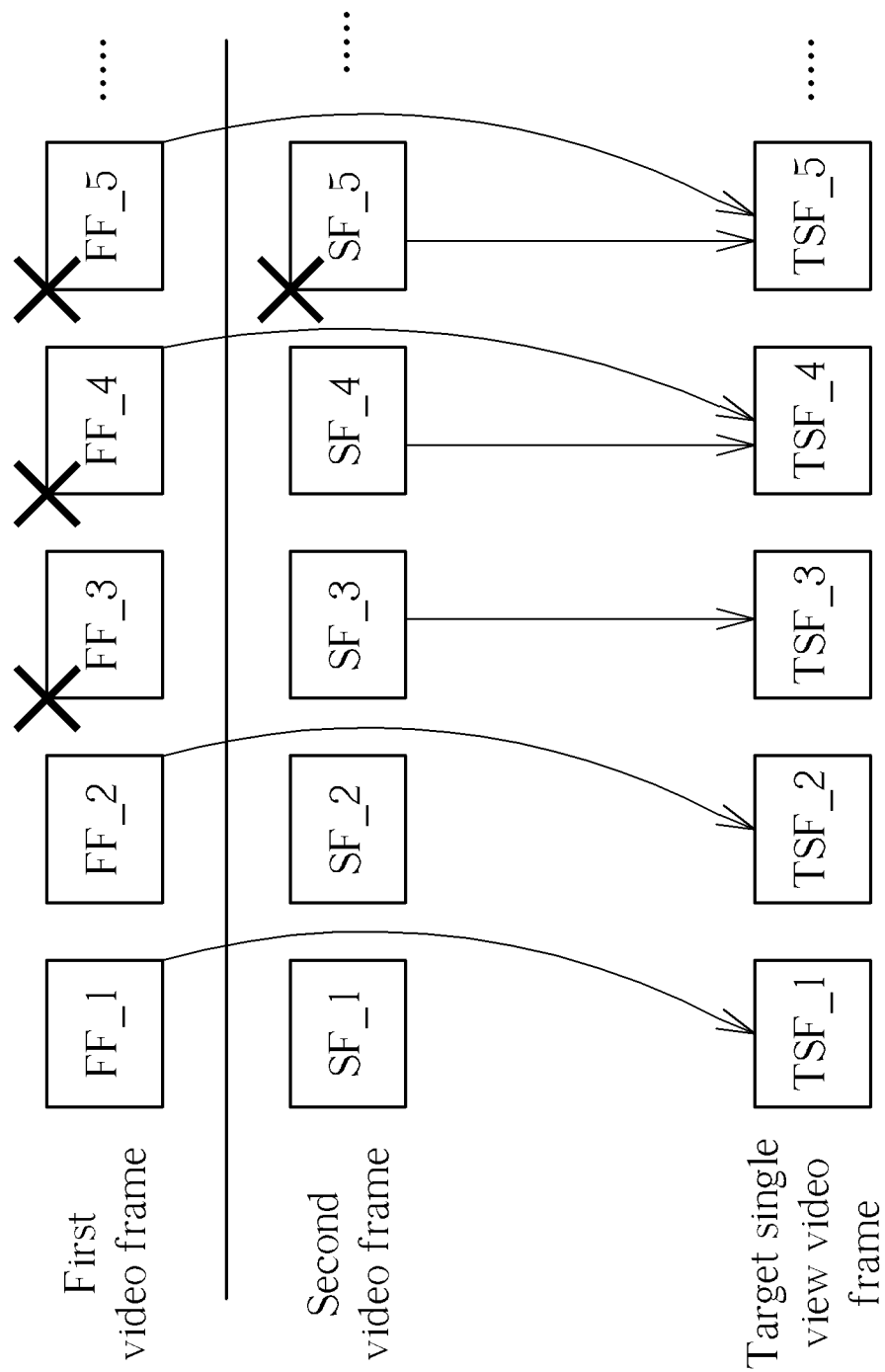
FIG. 1 is a schematic diagram illustrating a video processing method according to one embodiment of the present application.

FIG. 1 is a schematic diagram illustrating a video processing method according to one embodiment of the present application. As shown in FIG. 1, one or more first video frames FF_1, FF_2 . . . FF_5 are captured by a first camera, and one or more second video frames SF_1, SF_2 . . . SF_5 are captured by a second camera. In one embodiment, the first camera captures each first video frame from the perspective of the left eye, the second camera captures each second video frame from the perspective of the right eye, but is not limited. For example, the first camera and the second camera may be two independent cameras comprise independent buttons and batteries. However, the first camera and the second camera are not limited to physically independent cameras. In one embodiment, the first camera and the second camera can be provided on a single electronic device, for example, two lenses on a single electronic device such as a camera or a mobile phone, using a single image sensor or independent image sensors. The video processing method of the present application is, for example, performed by the processing unit of the single electronic device.

The target single view video frames TSF_1, TSF_2 ... TSF_5 are, for example, the video frames to be output to a display for displaying, but not limited. Such target single view video frame can be generated based on only the first video frame, or both the first video frame and the second video frame, which will be described later.

Figure 2:
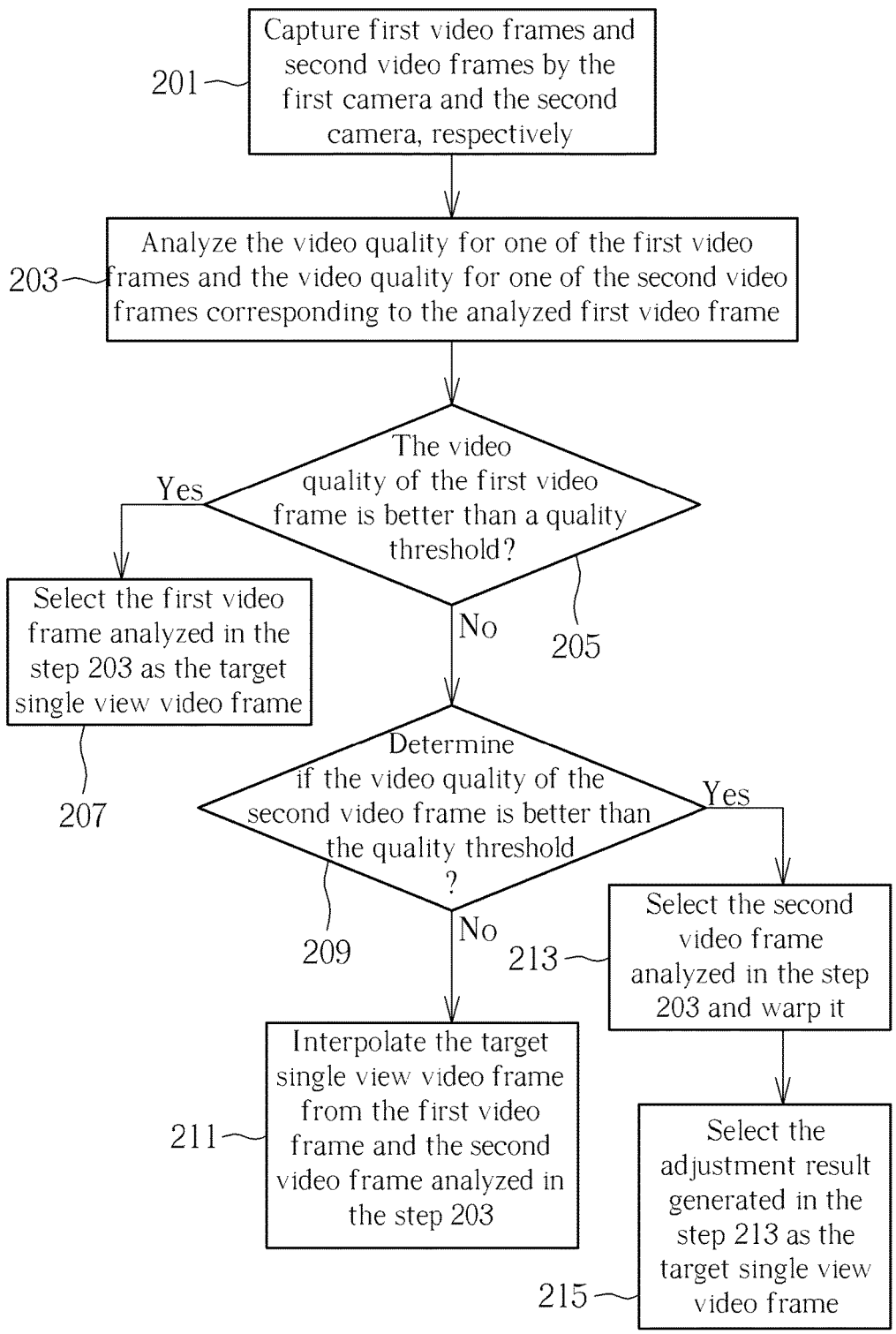
FIG. 2 is a flow chart illustrating the steps for the video processing method illustrated in FIG. 1, according to one embodiment of the present application.

FIG. 2 is a flow chart illustrating the steps for the video processing method illustrated in FIG. 1, according to one embodiment of the present application. As shown in FIG. 2, the video processing method comprises:

Step 201

Capture first video frames and second video frames by the first camera and the second camera, respectively.

Step 203

Analyze the video quality for one of the first video frames and the video quality for one of the second video frames corresponding to the analyzed first video frame. For example, analyze the video quality for the first video frame FF_2 and the second video frame SF_2. A first video frame and a second video frame which are corresponding to each other are, for example, frames captured at the same or similar time point by the first and the second cameras, respectively. However, the present application is not limited thereto.

Many methods can be applied to analyze the video quality. For example, the blur level/the sharpness level of each entire video frame and/or the region of interest (e.g., one or combination of the face region, the center region, and the auto-focus region) in each video frame can be computed to analyze the video quality. Also, the video frame can be compared to a reference video frame to analyze the video quality. Besides, at least one of the following parameters of each entire video frame and/or the region of interest can be computed to analyze the video quality: noise, edge, dynamic range, blocking artifact, mean intensity, color temperature, scene composition, people face and/or animal presence, image content that attracts more or less interest, and Spatial/temporal/Frequency masking.

Step 205

Determine if the video quality of the first video frame is better than a quality threshold. If yes, it means the video quality is good, go to step 207, if not, it means the video quality is bad, go to step 209.

Step 207

Select the first video frame analyzed in the step 203 as the target single view video frame. For example, the first video frame FF_1 is determined to have a video quality better than the quality threshold, therefore the first video frame FF_1 is selected as the target single view video frame TSF_1.

Step 209

Determine if the video quality of the second video frame is better than the quality threshold. If yes, go to step 213, if not, go to step 211.

Step 211

Interpolate the target single view video frame from the first video frame and the second video frame analyzed in the step 203. For example, both the first video frame FF_5 and the second video frame SF_5 are determined to have a video quality lower than the quality threshold, therefore the target single view video frame TSF_5 is interpolated from the first video frame FF_5 and the second video frame SF_5.

Step 213

Select the second video frame analyzed in the step 203 and warp it. For example, the first video frame FF_3 is determined to have a video quality lower than the quality threshold and the second video frame SF_3 is determined to have a video quality better than the quality threshold. Therefore, the second video frame SF_3 is warped based on the first video frame FF_3 to generate a warped second video frame. To be specific, the warp operation performed on the second video frame is to eliminate the difference between the second video frame and the corresponding first video frame due to the different viewing perspectives.

For the convenience for understanding, the second video frame can be named as a candidate second frame if the second video frame corresponds to the first video frame analyzed in the step 203. For example, if the first video frame FF_4 is analyzed in the step 203, the second video frame SF_4 is named a candidate second video frame, and the first video frame FF_4 is named a candidate first video frame.

Please note, in one embodiment, the step 203 only analyzes the first video frame. In such embodiment, the steps 209, 211 can be removed, such that the step 205 can go to the step 213 if the result of the step 205 is no.

Step 215

Select the adjustment result generated in the step 213 as the target single view video frame. For example, in FIG. 1, the target single view video frame TSF_3 is generated by warping the second video frame SF_3 based on the first video frame FF_3.

The step 213 can be replaced by other steps. In one embodiment, the second video frame is warped, and the target single view video frame is generated via synthesizing the warped second video frame and the first video frame corresponding to the warped second video frame. For example, in FIG. 1, the target single view video frame TSF_4 may be generated by warping the second video frame SF_4 based on the first video frame FF_4 firstly, and then synthesizing the warped second video frame and the first video frame FF_4. In another embodiment, the target single view video frame is generated via interpolating the first video frame and the second video frame. For example, in FIG. 1, the target single view video frame TSF_4 may be a new video frame which is interpolating from the first video frame FF_4 and the second video frame SF_4.

Alternatively, the steps 213, 215 can be replaced by: enhancing the first video image based on the second video frame to generate the target single view video frame if the video quality of the first video frame is bad and the video quality of the second video frame is good. For example, if the first video frame FF_4 has a bad video quality and the second video frame SF_4 has a good video quality, the first video frame FF_4 is enhanced based on the second video frame SF_4 to generate the target single view video frame TSF_4.

Furthermore, the step 211 can be replaced by other steps. In one embodiment, the first video frame analyzed in the step 203 is selected as the target single view video frame, since both video qualities of the first and the second video frames analyzed in the step 203 are worse than the quality threshold. Alternatively, one of the first and the second video frames analyzed in the step 203 having a better video quality will be selected as the target single view video frame. That is, either the first video frame or the second video frame can be selected as the target single view video if both the first video frame or the second video have video qualities worse than the quality threshold.

In the embodiment of FIG. 1, the frame rates of the first camera and the second camera are the same, and corresponding first video frames and second video frames are simultaneously generated (ex. FF_1/SF_1 are simultaneously generated, and FF_2/SF_2 are simultaneously generated). However, it does not mean to limit the scope of the present application, the two cameras may have different frame rates and the corresponding first video frames and second video frames can be generated at different time points. Furthermore, the corresponding first video frames and second video frames may be generated at different time points even the two cameras have the same frame rates. For example, the capture of the first video frames and the second video frames is staggered in time, but with an identical frame rate. Additionally, the time intervals between the video frames can be different.

Figure 3:
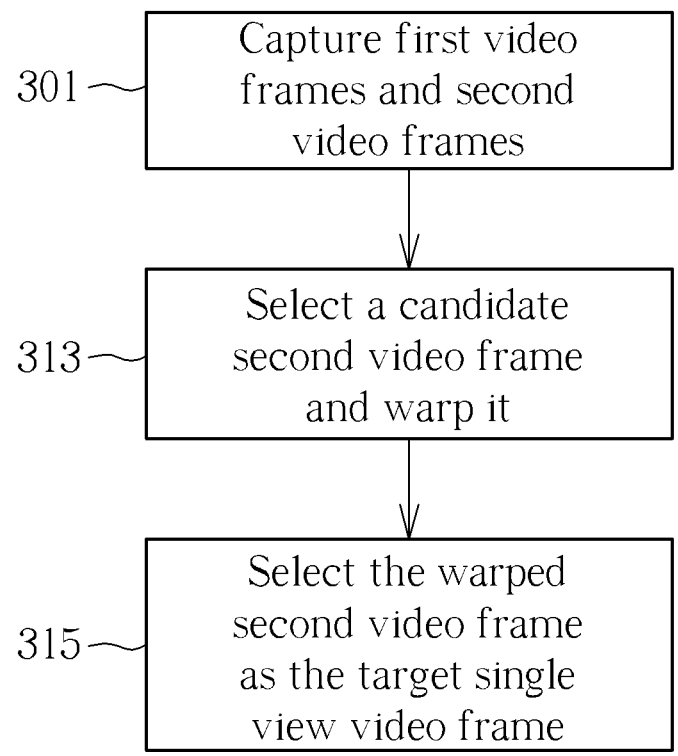
FIG. 3 is a flow chart illustrating the steps for the video processing method illustrated in FIG. 1, according to another embodiment of the present application.

Additionally, in one embodiment the video quality analyzing and determining steps are removed from the flow chart in FIG. 2, as shown in FIG. 3. In such embodiment, one candidate second video frame (the second video frame corresponding to the analyzed first video frame, as above-mentioned description) is adjusted based on the first video frame to generate the target single view video frame. As shown in steps 313, 315 in FIG. 3, the target single view video frame is the warped candidate second video frame. Alternatively, the target single view video frame may be generated by synthesizing the warped second video frame and the corresponding first video frame.

Figure 4:
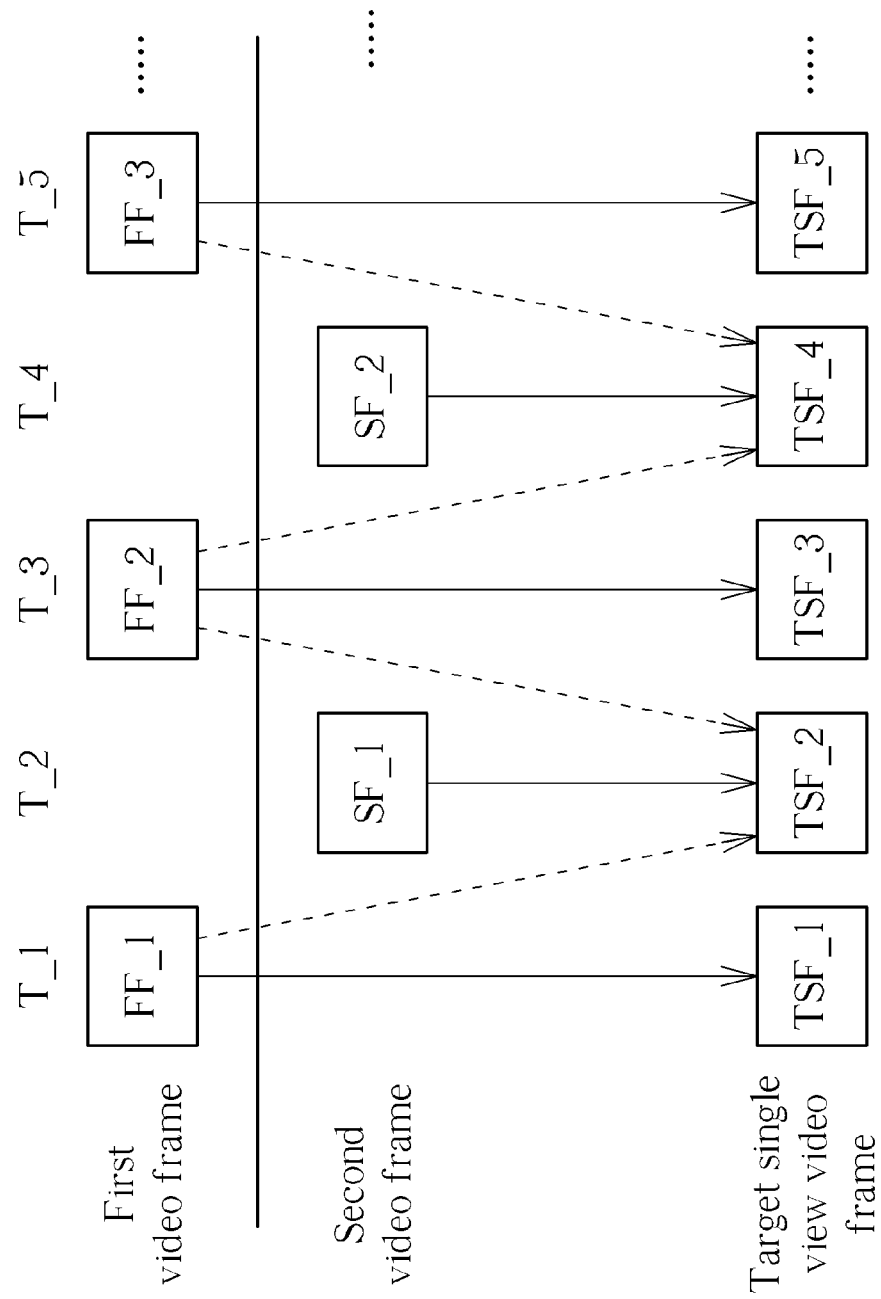
FIG. 4 is a schematic diagram illustrating a video processing method according to one embodiment of the present application.

FIG. 4 is a schematic diagram illustrating a video processing method according to one embodiment of the present application. As shown in FIG. 4, the first video frames FF_1, FF_2, FF_3 and the second video frames SF_1, SF_2 are interleavingly captured by the first camera and the second camera, respectively. The first camera and the second camera are, for example, reside in a single electronic device. In one embodiment, the video frame rate for outputting the target single view video frames to the display is higher than which of the first camera and the second camera.

In the embodiment of FIG. 4, the target single view video frames can be generated via following methods: select the first video frame or the second video frame as the target single view video frame without modification (ex. FF_1 and TSF_1); warp or interpolate the second video frame as the target single view video frame according to the first video frame prior to or after the second video frame (ex. warp SF_1 according to FF_1 and FF_2); warp the first video frame and the second video frame to the same view to generate the target single view video frame (ex. SF_2 and FF_3 are warped to respectively generate TSF_4 and TSF_5); warp or interpolate the first video frame as the target single view video frame according to the second video frame prior to or after the first video frame, and warp or interpolate the second video frame as the target single view video frame according to the first video frame prior to or after the second video frame. Please note warp or interpolate described in this application indicates at least one the warp operation and the interpolating operation is performed. Please note the video quality analyzing and determining steps can be applied to the embodiment illustrated in FIG. 4, to determine which method for generating the target single vide video frame should be applied.

Figure 5:
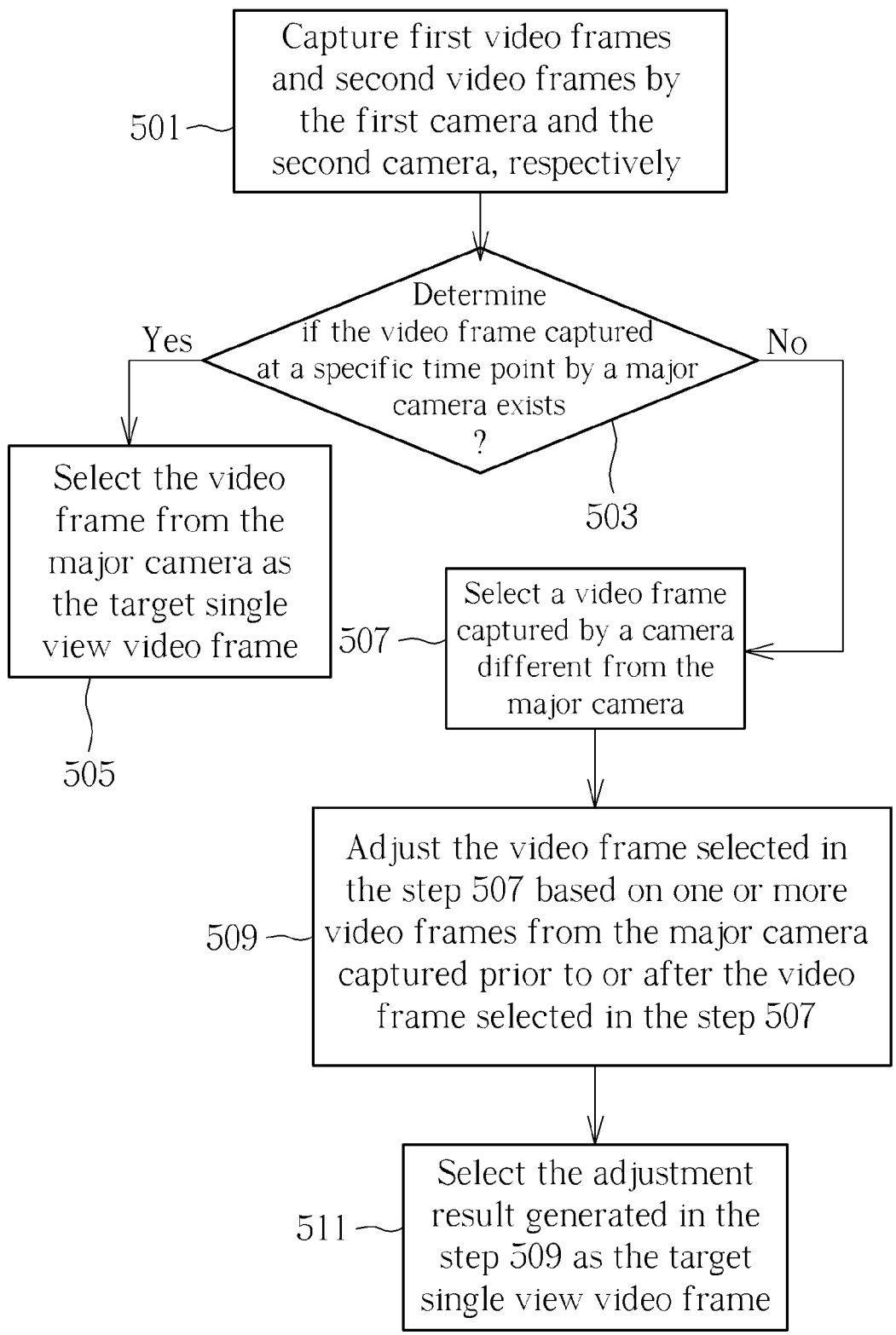
FIG. 5 is a flow chart illustrating the steps for the video processing method illustrated in FIG. 4, according to one embodiment of the present application.

FIG. 5 is a flow chart illustrating the steps for the video processing method illustrated in FIG. 4, according to one embodiment of the present application. FIG. 5 comprises the following steps:

Step 501
Capture first video frames and second video frames by the first camera and the second camera, respectively.

Step 503
Determine if the video frame captured at a specific time point by a major camera exists. In this embodiment, the first camera is set as the major camera. In another embodiment, however, the second camera is set as the major camera. If yes, go to step 505, if not, go to step 507.

Step 505
Select the video frame from the major camera as the target single view video frame. For example, assuming that the specific time point is time points T_1, T_3, or T_5, the first video frames FF_1, FF_2 and FF_3 exist, thus the first video frames FF_1, FF_2 and FF_3 are selected as the target single view video frames TSF_1, TSF_3 and TSF_5, without modification. In one embodiment, some modifications can be applied to the first video frames FF_1, FF_2 and FF_3. For example, the process of brightness adjustment and/or sharpness enhancement can be performed to the first video frames FF_1, FF_2 and FF_3, and then the modified first video frames are selected as the target single view video frames.

Step 507
Select a video frame captured by a camera different from the major camera (e.g., the second camera). For example, assuming that the specific time point is time points T_2 or T_4, the first video frames do not exist, thus the second video frames SF_1, SF_2 are selected.

Step 509
Adjust the video frame selected in the step 507 based on one or more video frames from the major camera captured prior to or after the video frame selected in the step 507. For examples, assuming that one of the second video frames is selected in the step 507, the selected second video frame is warped and/or interpolated according to one or more first video frames prior to or after the selected second frame. Please note the interpolate operation in this application is not limited to a video frame directly adjacent to the selected video frame. For example, an interpolated video frame corresponding to the time point T_4 may be generated based on the second video frame SF_2 and at least one of the first video frames FF_2 and FF_3. Alternatively, the interpolated video frame corresponding to the time point T_4 may be generated based on the second video frame SF_2 and the first video frame FF_1.

Step 511
Select the adjustment result generated in the step 509 as the target single view video frame. In this embodiment, the second video frame which is warped and/or interpolated is selected as the target single view video frame.

In another embodiment, the step 509 in FIG. 5 can be removed, and the target single view video frame is the second video frame selected in the step 507. For example, at the time points T_2 and T_4, the second video frames SF_1 and SF_2 are selected to be the target single view video frames TSF_2 and TSF_4, without modification. Alternatively, the brightness, sharpness and/or other attributes of the second video frames SF_1 and SF_2 may be adjusted before being selected as the target single view video frames TSF_2 and TSF_4.

In yet another embodiment, the step 505 in FIG. 5 can be replaced by other steps. For example, the first video frame corresponding to the specific time point is warped and/or interpolated according to one or more second video frames prior to or after the first video frame, then selected as the target single view video frame for output.

In still another embodiment, all of the first video frames and the second video frames are warped to the same specific view, and then selected as the target single view video frames for output. For example, in FIG. 4, the first video frames FF_1 to FF_3 and the second video frames SF_1 and SF_2 are outputted interleavingly after being warped to the same viewing direction.

In the embodiment of FIG. 4 the first camera and the second camera have the same video frame rate, and the interval between the first video frames or the second video frames are the same. However, the first camera and the second camera may have different video frame rates, and the interval between the first video frames or the second video frames may be different either.

The embodiments of FIG. 1 and FIG. 4 can further comprise: interpolating at least two of the first video frames to generate a new first video frame, and adjusts the candidate second video frame based the new first video frame to generate the target single view video frame. Take the second video frame SF_2 in FIG. 1 for example, if no first video frame FF_2 in FIG. 1 exists or the quality of first video frame FF_2 is too bad, which is simultaneously captured, a new first video frame is generated based on the first video frames FF_1 and FF_3, and the second video frame SF_2 is adjusted according to the new first video frame.

The above-mentioned embodiments can be summarized as: A video frame processing method, comprising: (a) capturing at least one first video frame via a first camera; (b) capturing at least one second video frame via a second camera; (c) adjusting one candidate second video frame of the second video frames based on one of the first video frame to generate a target single view video frame.

Figure 6:
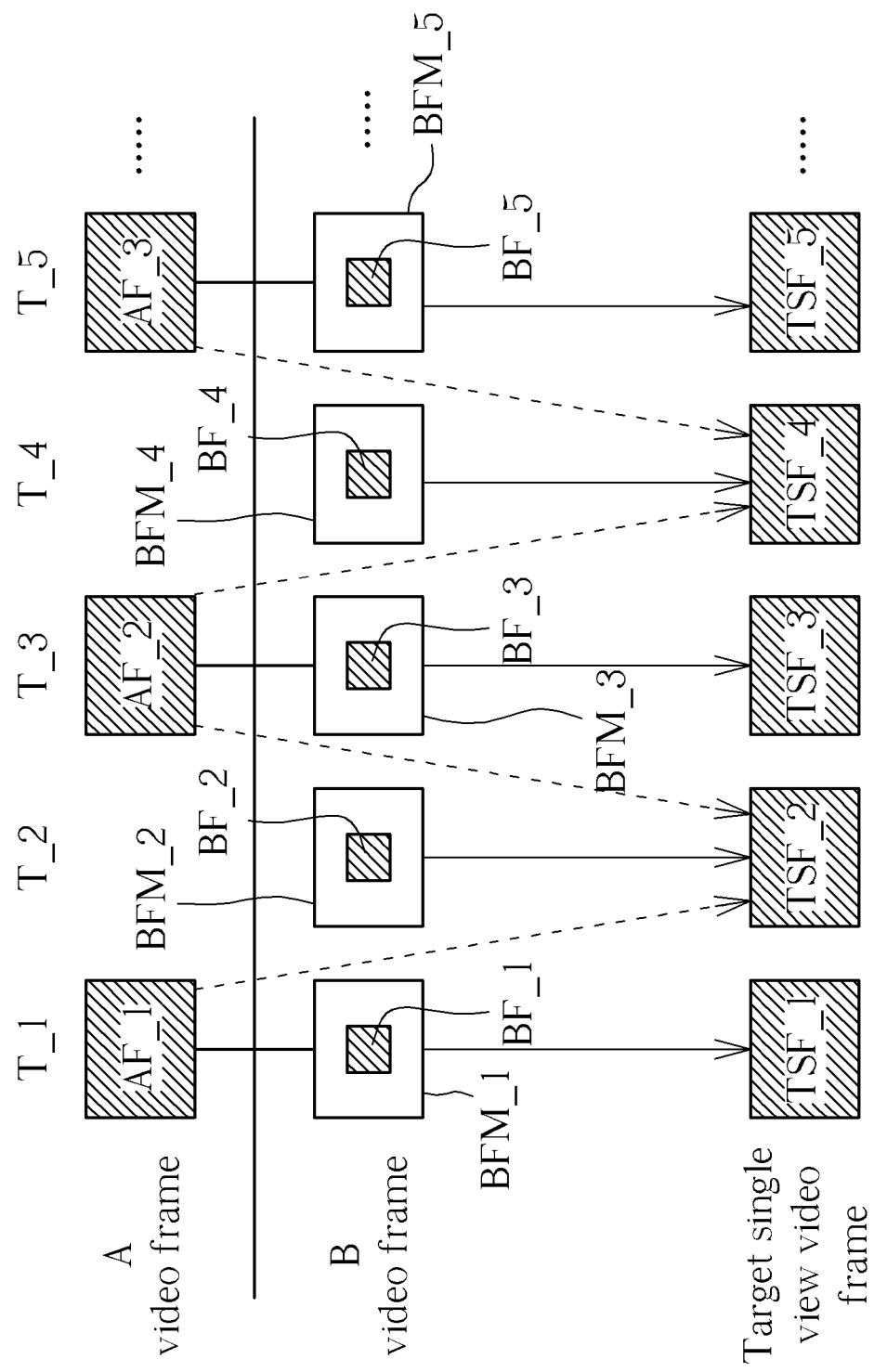
FIG. 6 is a schematic diagram illustrating a video processing method according to another embodiment of the present application.

FIG. 6 is a schematic diagram illustrating a video processing method according to another embodiment of the present application. In the following embodiments, an A camera and a B camera are provided to respectively capture A video frames and B video frames. In FIG. 6, the A video frames are denoted as AF_1 to AF_3, and so on. And, the B video frames are denoted as BF_1 to BF_5, and so on. The A video frames and the B video frames are captured via different camera parameters. For example, the A camera has frame rate lower than which of the B camera, and the A video frames have video frame resolutions higher than which of the B video frames, as illustrated in FIG. 6. In one embodiment, the A video frames are in a Full HD format and captured at a frame rate of 15 fps, while the B video frames are in a VGA format and captured at a frame rate of 30 fps. The video processing method can be applied to generate and output the target single view video frames in the full HD format at a frame rate of 30 fps. That is, a video frame resolution of the target single view video frame is the same as the first video frame, and a frame rate of the target single view video frame is the same as the second video frame.

In one embodiment, one of the two cameras which can provide the highest video frame resolution will be selected as a major camera (e.g., the A camera), and the target single view video frames can be generated via following method: interleavingly selecting an A video frame without modification and an interpolated B video image as the target single view video frame. In FIG. 6, the interpolated B video images are denoted as BFM_1 to BFM_5, and so on. In this embodiment, the selection of the A video frame and the interpolated B video image is staggered in time. Each interpolated B video image is synthesized according to the B video frame and at least one of the adjacent frames captured by the A camera and/or the B camera. For example, the interpolated B video frame BFM_2 is synthesized according to the second video frame BF_2 and at least one of the A video frames AF_1 and AF_2, and the B video frames BF_1 and BF_3. In one embodiment, each interpolated B video frame being synthesized has the same video frame resolution as which of the A video frame. By this way, the frame rate of the target single view video frame is larger than which of the first video frames, and the video frame resolution of the target single view video frame is larger than which of the second video frames.

Figure 7:
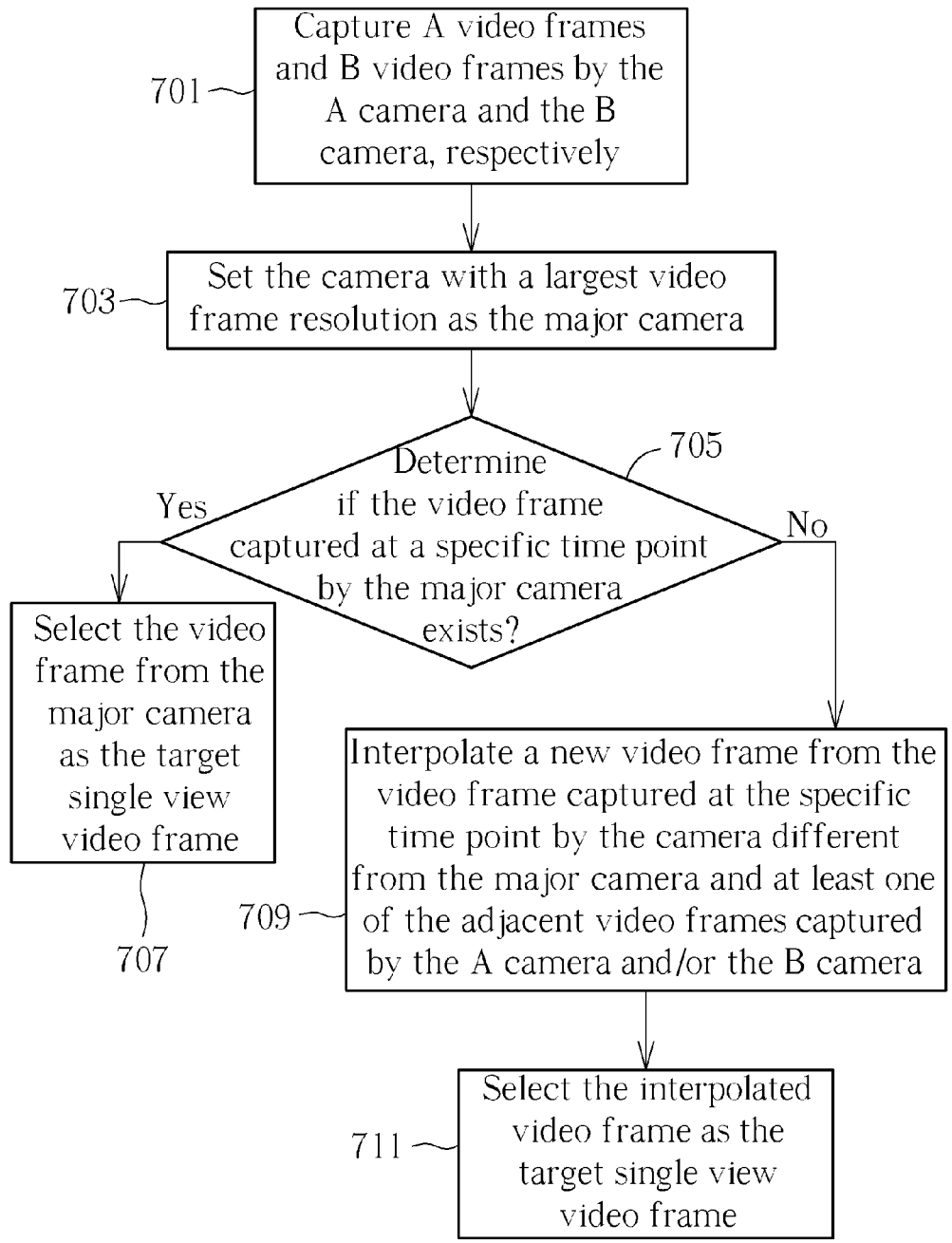
FIG. 7 is a flow chart illustrating the steps for the video processing method illustrated in FIG. 6, according to one embodiment of the present application.

FIG. 7 is a flow chart illustrating the steps for the video processing method illustrated in FIG. 6, according to one embodiment of the present application. The flow chart in FIG. 7 comprises the following steps:

Step 701

Capture A video frames and B video frames by the A camera and the B camera, respectively.

Step 703

Set the camera with a largest video frame resolution as the major camera. For example, in the embodiment of FIG. 6, the A camera is set as the major camera.

Step 705

Determine if the video frame captured at a specific time point by the major camera exists. If yes, go to step 707, if not, go to step 709.

Step 707

Select the video frame from the major camera as the target single view video frame. For example, at time points T_1 and T_3, the A video frames AF_1 and AF_2 exist, thus the A video frames AF_1 and AF_2 are selected as the target single view video frames. In one embodiment, the A video frames AF_1 and AF_2 can be directly selected as the target single view video frames. However, in another embodiment, some modification (ex. sharpness enhancement or brightness adjustment) can be performed to the A video frames first, and then the modified A video frames can be selected as the target single view video frames.

Step 709

Interpolate a new video frame from the video frame captured at the specific time point by the camera different from the major camera and at least one of the adjacent video frames captured by the A camera and/or the B camera. It is assumed that the A camera is the major camera, then a new video frame is interpolated from the B video frame captured at the specific time point and at least one of the adjacent video frames captured by the A camera and/or the B camera, wherein the adjacent video frames are the video frames captured at or near the specific time point. Taking the time point T_2 as an example, the adjacent video frames may be one or a combination of the A video frames AF_1 and AF_2, and the B video frames BF_1 and BF_3.

Step 711

Select the interpolated video frame as the target single view video frame. For example, at the time point T_2, no A video frame exist, thus the target single view video frame is generated from interpolating the B video frame BF_2, and at least one of B video frames BF_1, BF_3, and A video frames AF_1, AF_2.

In another embodiment, one of the two cameras which can support the highest video frame rate will be selected as a major camera (e.g., the B camera), and the target single view video frames in FIG. 6 can be further generated via following method: selecting each interpolated B video frame as the target single view video frame. The interpolated B video image is synthesized according to the corresponding B video frame and at least one of the A video frames captured at or near the time at which the B video frame being captured. For example, the interpolated B video frame BFM_1 is synthesized according to the B video frame BF_1 and the A video frames AF_1. In another example, the interpolated B video frame BFM_2 is synthesized according to the B video frame BF_2 and at least one of the A video frames AF_1, AF_2. In another embodiment, the interpolated B video image is generated according to the corresponding B video frame and at least one adjacent frames captured by the A camera and/or the B camera. By this way, the video frame rate of the target single view video frame is the same as which of the A video frames, and the video frame resolution of the target single view video frame is larger than which of the B video frames.

Figure 8:
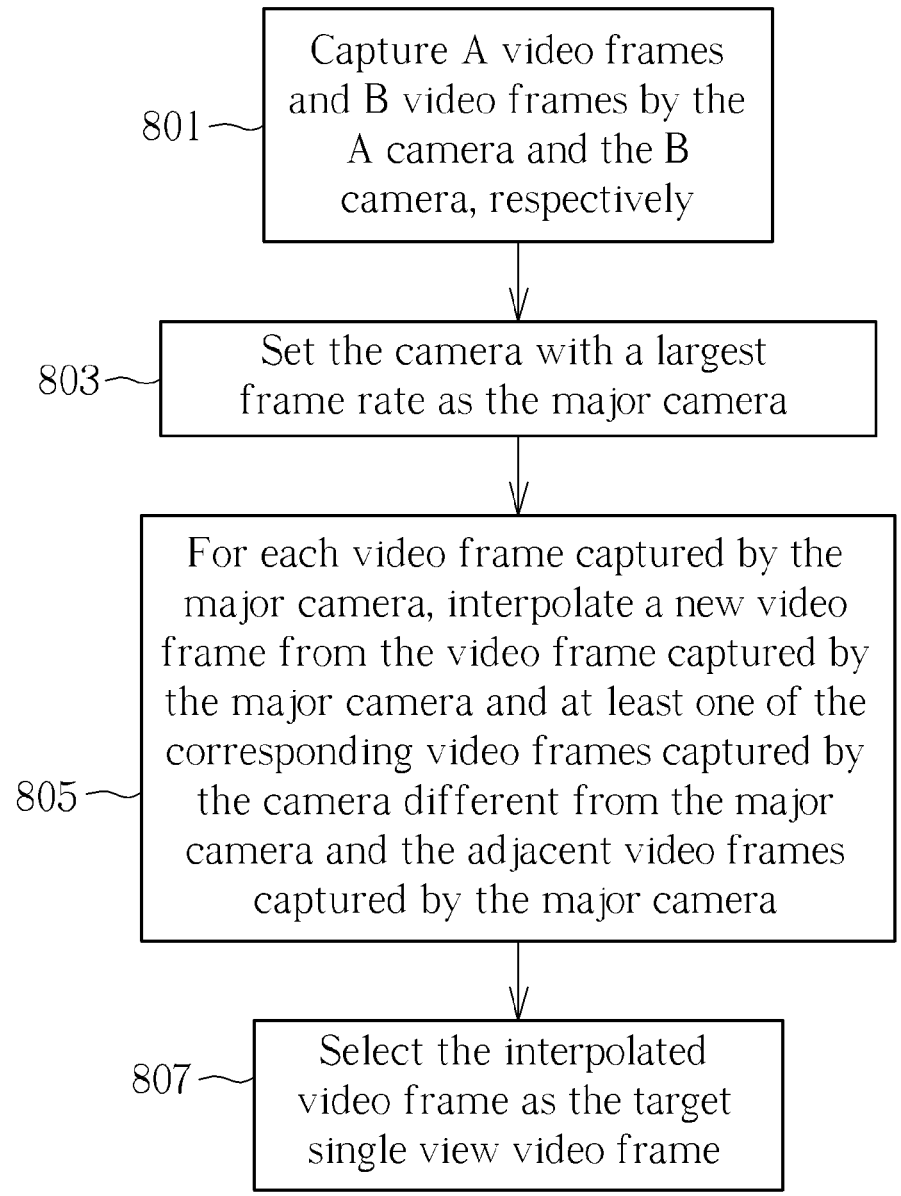
FIG. 8 is a flow chart illustrating the steps for the video processing method illustrated in FIG. 6, according to another embodiment of the present application.

FIG. 8 is a flow chart illustrating the steps for the video processing method illustrated in FIG. 6, according to another embodiment of the present application. The flow chart in FIG. 8 comprises the following steps:

Step 801

Capture A video frames and B video frames by the A camera and the B camera, respectively.

Step 803

Set the camera with a largest frame rate as the major camera. For example, in the embodiment of FIG. 6, the B camera is set as the major camera.

Step 805

For each video frame captured by the major camera, interpolate a new video frame from the video frame captured by the major camera and at least one of the corresponding video frames captured by the camera different from the major camera and the adjacent video frames captured by the major camera. It is assumed that the B camera is the major camera, then for each B video frame, interpolate a new video frame from the B video frame and at least one of: the corresponding A video frames and the adjacent B video frames. In which, the corresponding A video frames are video frames captured at or near (e.g., prior to or after) a time point that the B video frame is captured, and the adjacent B video frames are video frames captured prior to or after the B video frame. Taking the B video frame BF_3 in FIG. 6 as an example, the corresponding A video frames may be the A video frame AF_2, and the adjacent B video frames may be the B video frames BF_2 and BF_4. The new video frame (i.e., the interpolated B video frame BFM_3) is interpolated from the B video frame BF_3 and at least one of the A video frame AF_2 and the B video frames BF_2 and BF_4.

The video frame resolution of the interpolated video frame is larger than which of the B video frame. For example, each of the interpolated B video frames BFM_1 to BFM_5 has video frame resolution the same as which of the A video frames AF_1 to AF_3, as shown in FIG. 6.

Step 807

Select the interpolated video frame as the target single view video frame. For example, in FIG. 6, the interpolated B video frames BFM_1 to BFM_5 are selected as the target single view video frames TSF_1 to TSF_5.

Figure 9:
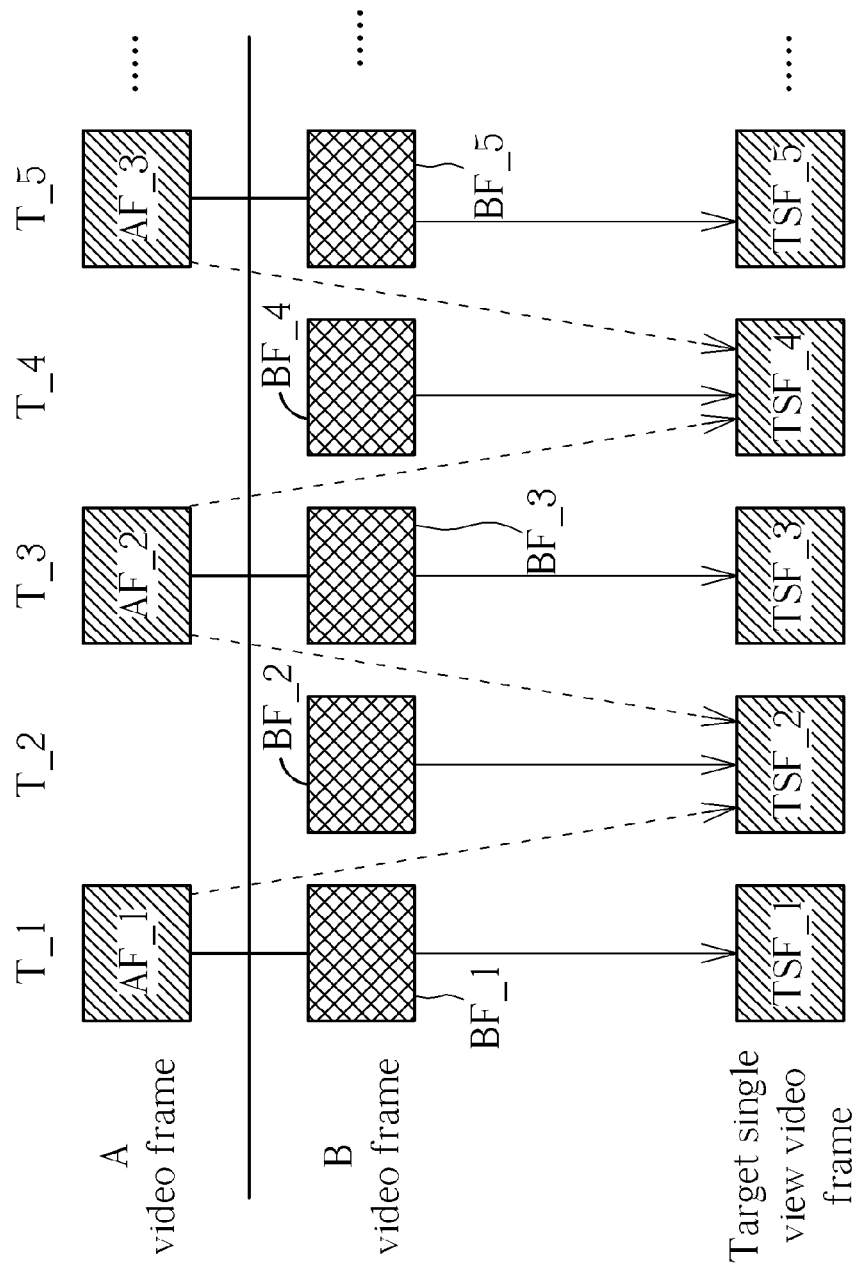
FIG. 9 is a schematic diagram illustrating a video processing method according to another embodiment of the present application.

FIG. 9 is a schematic diagram illustrating a video processing method according to another embodiment of the present application. The embodiment of FIG. 9 is similar with the embodiment of FIG. 6, one different between the embodiments of FIG. 6 and FIG. 9 is that the A video frames and B video frames have different frame capturing parameters in FIG. 9 rather the video frame resolutions in FIG. 6. The frame capturing parameters can comprises at least one of: capturing time, exposure time, depth of field, focus, ISO speed, and white balance.

Figure 10:
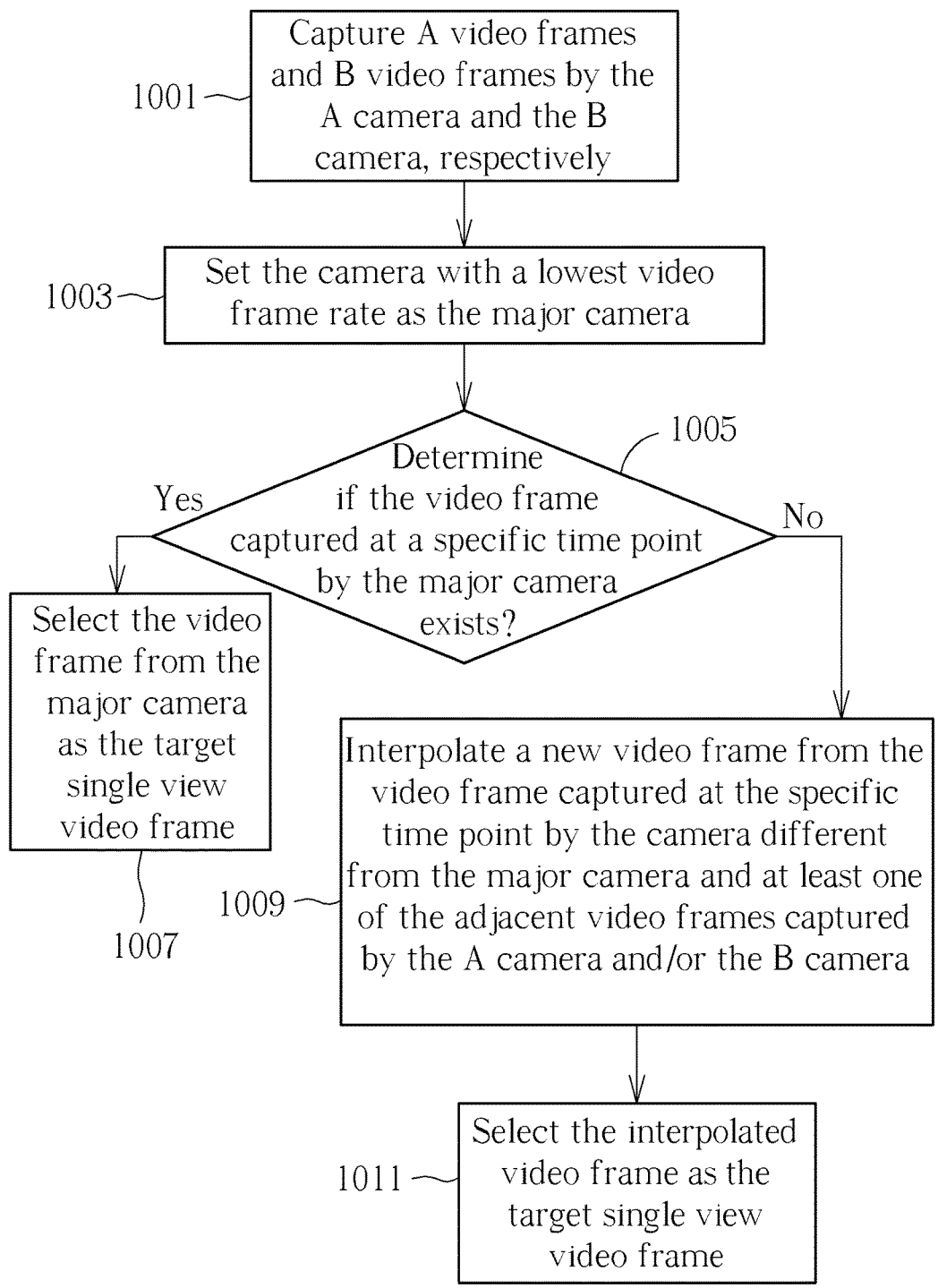
FIG. 10 is a flow chart illustrating the steps for the video processing method illustrated in FIG. 9, according to one embodiment of the present application.

FIG. 10 is a flow chart illustrating the steps for the video processing method illustrated in FIG. 9, according to one embodiment of the present application. The flow chart in FIG. 10 comprises:

Step 1001

Capture A video frames and B video frames by the A camera and the B camera, respectively.

Step 1003

Set the camera with a lowest video frame rate as the major camera. For example, in the embodiment of FIG. 9, the A camera is set as the major camera.

Step 1005

Determine if the video frame captured at a specific time point by the major camera exists. If yes, go to step 1007, if not, go to step 1009.

Step 1007

Select the video frame from the major camera as the target single view video frame. For example, at time points T_1 and T_3, the A video frames AF_1 and AF_2 exist, thus the A video frames AF_1 and AF_2 are selected as the target single view video frames, with or without modification as illustrated in the embodiment of FIG. 7.

Step 1009

Interpolate a new video frame from the video frame captured at the specific time point by the camera different from the major camera and at least one of the adjacent video frames captured by the A camera and/or the B camera. It is assumed that the A camera is the major camera, then a new video frame is interpolated from the B video frame captured at the specific time point and at least one of the adjacent video frames captured by the A camera and/or the B camera, wherein the adjacent video frames are the video frames captured at or near the specific time point. Taking the time point T_2 as an example, the adjacent video frames may be one or a combination of the A video frames AF_1 and AF_2, and the B video frames BF_1 and BF_3.

Step 1011

Select the interpolated video frame as the target single view video frame. For example, at the time points T_2, no A video frame exist, thus the target single view video frame is generated from interpolating the B video frame BF_2, and at least one of B video frames BF_1, BF_3, A video frames AF_1, AF_2.

Figure 11:
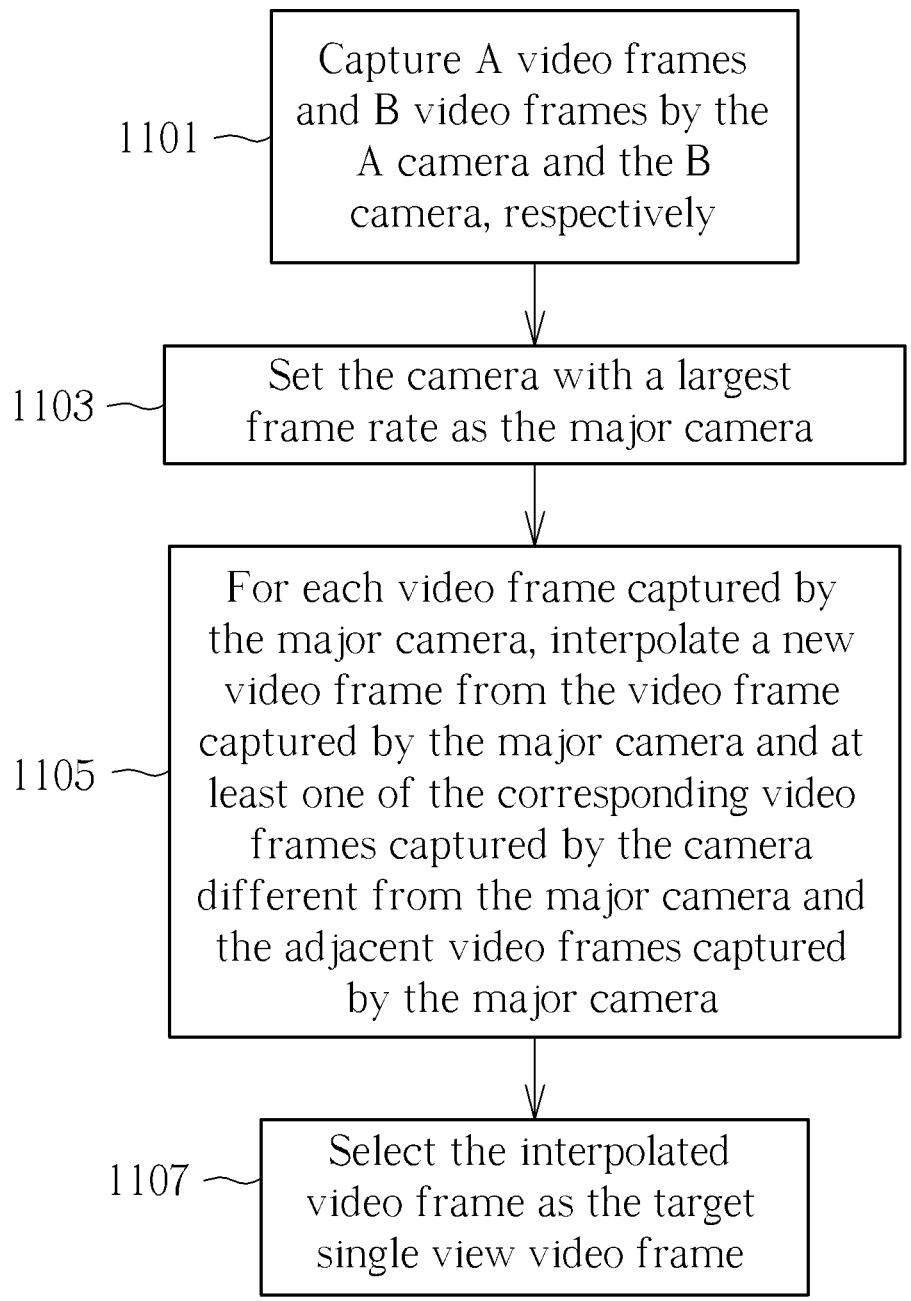
FIG. 11 is a flow chart illustrating the steps for the video processing method illustrated in FIG. 9, according to another embodiment of the present application.

FIG. 11 is a flow chart illustrating the steps for the video processing method illustrated in FIG. 9, according to another embodiment of the present application. The flow chart in FIG. 11 comprises the following steps:

Step 1101

Capture A video frames and B video frames by the A camera and the B camera, respectively.

Step 1103

Set the camera with a largest frame rate as the major camera. For example, in the embodiment of FIG. 9, the B camera is set as the major camera.

Step 1105

For each video frame captured by the major camera, interpolate a new video frame from the video frame captured by the major camera and at least one of the corresponding video frames captured by the camera different from the major camera and the adjacent video frames captured by the major camera. It is assumed that the B camera is the major camera, then for each B video frame, interpolate a new video frame from the B video frame and at least one of: the corresponding A video frames and the adjacent B video frames. In which, the corresponding A video frames are video frames captured at or near (e.g., prior to or after) a time point that the B video frame is captured, and the adjacent B video frames are video frames captured prior to or after the B video frame. Taking the B video frame BF_3 in FIG. 9 as an example, the corresponding A video frames may be the A video frame AF_2, and the adjacent B video frames may be the second video frames BF_2 and BF_4. The new video frame is interpolated from the B video frame BF_3 and at least one of the A video frame AF_2 and the B video frames BF_2 and BF_4.

Step 1107

Select the interpolated video frame as the target single view video frame.

In this embodiment, the video frame rate of the target single view video frames is the same as the B video frames. Furthermore, the video quality can be enhanced by synthesizing the B video frames with the A video frames. For example, when the brightness for some dark regions of the B video frame is too low, it may be compensated based on a corresponding region of the A video frame.

Please note the A video frames and the B video frames of the embodiments in FIG. 6 and FIG. 9 can be interleavingly captured, as the embodiment of FIG. 4. In this embodiment, the video frame rate of the first camera is identical to the video frame rate of the second camera.

It would be appreciated that the brightness of the video frame is affected by factors such as the exposure time and/or the ISO speed. In another embodiment of the present application, the camera parameter of the A camera and the camera parameter of the B camera are the exposure time and/or the ISO speed, and are set differently. In this embodiment, assuming that the A camera is selected as the major camera, then the A video frame can be compensated by the corresponding B video frame. To be specific, for the A video frame corresponding to each specific time point, at least one region to be enhanced in the A video frame is determined according to the camera parameter of the A camera, and at least one region to be referenced in the B video frame corresponding to the specific time point is determined according to the camera parameter of the B camera. Accordingly, the at least one region to be enhanced in the A video frame can be enhanced based on the at least one region to be referenced in the B video frame.

For example, assuming that some region in the A video image is overexposed while the brightness of the other region is fine due to the camera parameter of the A camera, and some region in the B video image is over dark while the brightness of the other region is fine due to the camera parameter of the B camera. The overexposed region (i.e., the region to be enhanced) in the A video image can be enhanced by the bright parts (i.e., the region to be referenced) in the corresponding B video image.

For another example, assuming that some region in the A video image is over dark while the brightness of the other region is fine due to the camera parameter of the A camera, and some region in the B video image is overexposed while the brightness of the other region is fine due to the camera parameter of the B camera. The over-dark region (i.e., the region to be enhanced) in the A video image can be enhanced by the dark parts (i.e., the region to be referenced) in the corresponding B video image.

Figure 12:
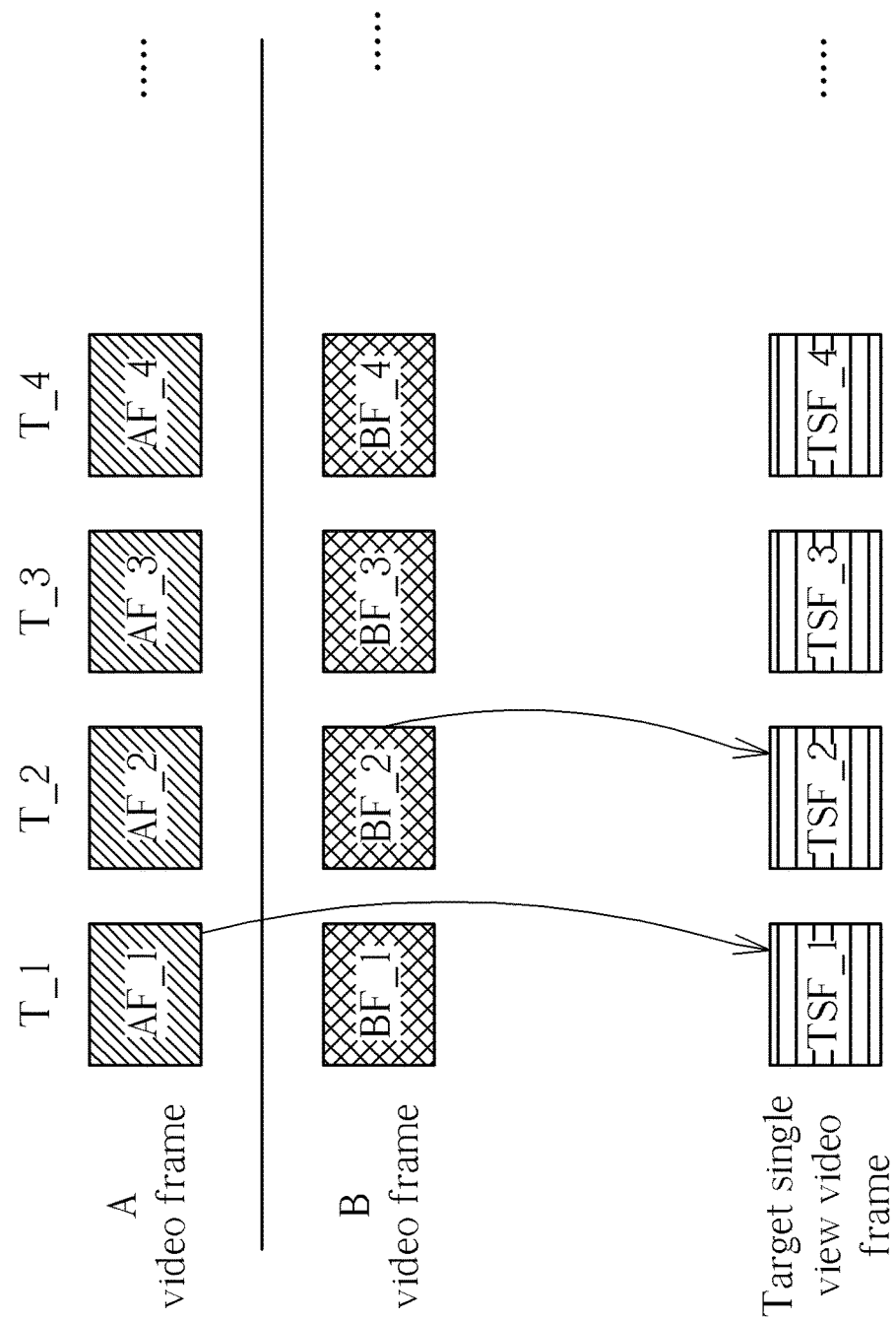
FIG. 12 and FIG. 13 are schematic diagrams illustrating a video processing method according to another embodiment of the present application.
Figure 13:
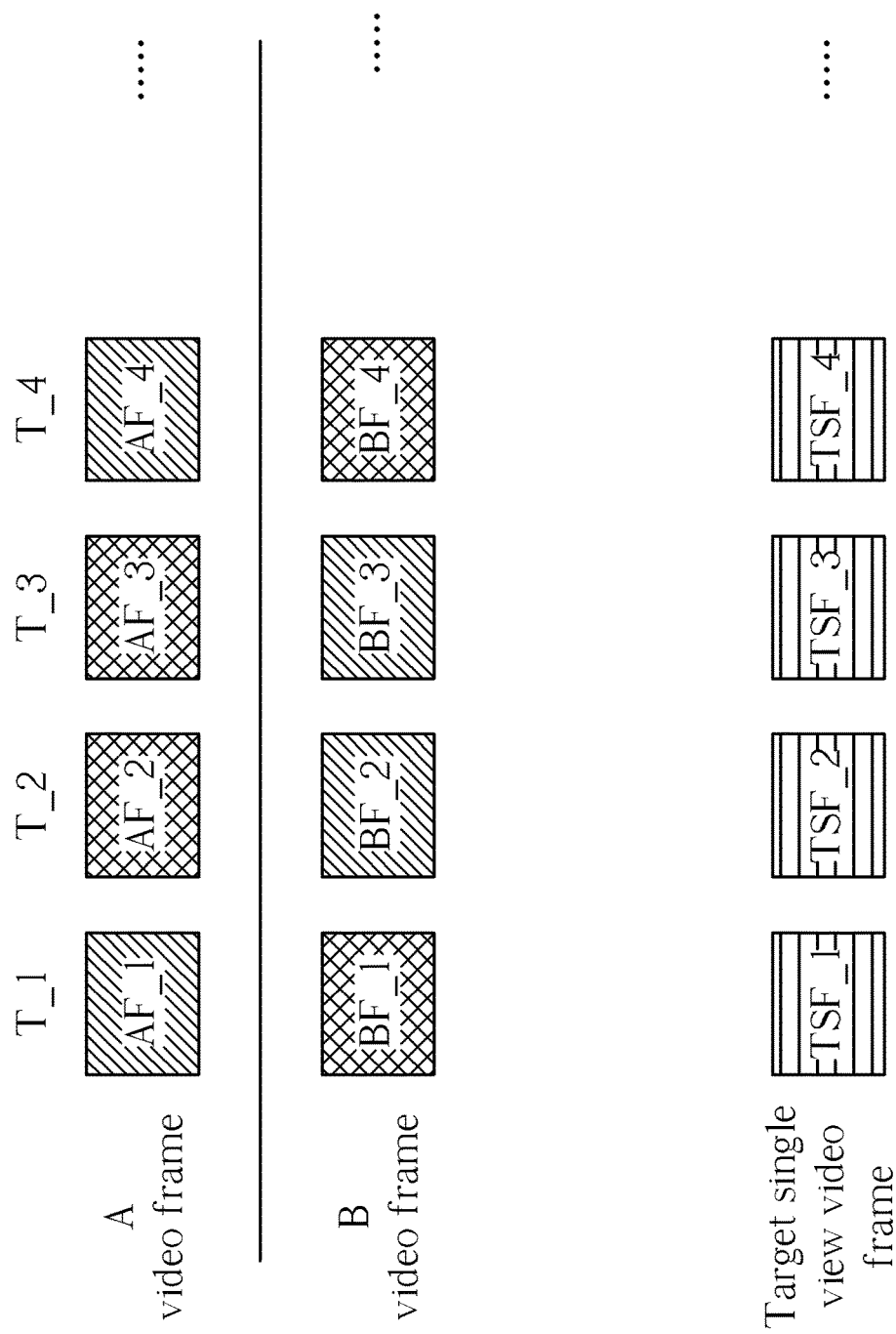

FIG. 12 is another embodiment of the present application. In the embodiment of FIG. 12, the A video frames and the B video frames are captured via the same video frame rates, but the A video frames have brightness higher than which of the B video frames. In such embodiment, the video frame(s) of one camera can be enhanced by the video frame(s) of the other camera. For example, assuming that the A camera is selected as the major camera. If the A video frame AF_1 is too bright, it can be enhanced based on the B video frame BF_1 to generate a target single view video frame TSF_1, since the B video frame BF_1 has lower brightness. In such case the B video frame BF_1 is regarded as the enhancing standard video frame, and the A video frame AF_1 is regarded as a video frame corresponding to the enhancing standard video frame. On the contrary, if the B video frame BF_2 is too dark, it can be enhanced and warped based on the A video frame AF_2 to generate a target single view video frame TSF_2, since the A video frame AF_2 has higher brightness. In such case the A video frame AF_2 is regarded as the enhancing standard video frame. Please note the enhancing here is not limited to mean enhancing the whole video frame based on another whole video frame. The enhancing here can mean enhancing a region of interest for one video frame based on a corresponding region of another video frame. For example, if a people face in the A video frame AF_3 is too bright, it is enhanced by the people face in the B video frame. FIG. 13 is an extended embodiment based on FIG. 12. In the embodiment of FIG. 12, the brightness of A video frames is all higher than which of the B video frames. However, in the embodiment of FIG. 13, the brightness of some A video frames is higher than which of corresponding B video frames (ex. A video frames AF_1, AF_4), but the brightness of some A video frames is lower than which of corresponding B video frames (ex. A video frames AF_2, AF_3). Therefore, for either the embodiment in FIG. 12 or the embodiment in FIG. 13, brightness of the A video frame and the B video frame is analyzed to determine if anyone has a predetermined brightness, and then the video frame having a brightness closer to the predetermined brightness is determined as the enhancing standard video frame, such that the other video frame is enhanced by the enhancing standard video frame. The enhancing standard video frame can be applied to all video frames of a video sequence after it is determined. However, if the enhancing standard video frame is captured by the major camera, the video frame enhanced by the enhancing standard video frame has to be warped based on the corresponding video frame captured by the major camera, so as to generate the target single view video frame.

For example, in one embodiment of FIG. 12, if the A video frame is determined as the enhanced video frame, all A video frames are enhanced based on video frames for B video frames. Alternatively, the enhancing standard video frame can be applied to only some video frames for the video sequence after it is determined, and the enhancing standard video frame can be changed in such case. For example, in FIG. 13, the A video frames AF_2, AF_3 are enhancing standard video frame for the B video frames BF_2, BF_3, but the B video frames BF_2, BF_3 are enhancing standard video frame for the A video frames AF_2, AF_3. Such variation should fall in the scope of the present application.

In view of the embodiments illustrated in FIG. 6-FIG. 11, the target single view video frames can be generated by the video frames from the major camera, based on the camera parameter such as video frame rate or video frame capturing parameter such as brightness or blur level. Therefore, the embodiments illustrated in FIG. 6-FIG. 11 can be summarized as: A video frame processing method, comprising: (a) capturing at least one first video frame via a first camera utilizing a first camera parameter; (b) capturing at least one second video frame via a second camera utilizing a first camera parameter, wherein the second camera parameter is different from the first camera parameter; and (c) generating a target single view video frame corresponding to each specific time point according to at least one first video frame, based on the first camera parameter and the second camera parameter. Please note the first camera and the second camera here only indicate two different cameras, and are not limited to have the same parameters (ex. resolution, frame rate . . . ) as which the first camera and the second camera.

Please note the corresponding relations of the first/second cameras and the A/B cameras are not fixed. For example, in one embodiment the video frame processing method comprises: determining if the first video frame corresponding to the specific time point exists; if yes, selecting the first video frame as the target single view video frame; and if not, interpolating a target single view video frame from one of the second video frames corresponding to the specific time point and one or more adjacent frames captured by the first camera and the second camera. In such case the first camera indicates the A camera, and the second camera indicates the B camera.

In another embodiment, the video frame processing method comprises: generating the target single view frame according to one candidate first frame, and at least one of: at least first video frame prior to or after the candidate first video frame, and at least second video frame prior to or after the candidate first video frame. In such case the first camera indicates the B camera, and the second camera indicates the A camera.

In view of above-mentioned embodiments, the target single view video frames can be generated from video frames with different camera parameters and video frame capturing parameters. Therefore a better target single view video frame can be acquired.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video frame processing method, comprising:
   capturing a first video frame via a first camera;
   capturing a second video frame via a second camera; and
   generating a target video frame that is non-stereoscopic and corresponds to a viewing perspective of the first video frame, including:
      selecting the first video frame as the target video frame when image quality of the first video frame is better than a quality threshold; and
      generating the target video frame by adjusting the first video frame or the second video frame when the image quality of the first video frame is not better than the quality threshold, including
         interpolating the first video frame and another video frame captured via the first camera to generate a third video frame, and
         adjusting the second video frame based the third video frame to generate the target video frame.

2. The video frame processing method of claim 1, further comprising:
   determining if the image quality of the first video frame is better than the quality threshold.

3. The video frame processing method of claim 1, wherein generating the target video frame comprises:
   warping the second video frame based on the first video frame.

4. The video frame processing method of claim 1, wherein the first video frame and the second video frame are simultaneously captured.

5. The video frame processing method of claim 4, wherein the first camera and the second camera are configured operate at a same video frame rate.

6. The video frame processing method of claim 1, wherein the first camera and the second camera interleavingly capture the first video frame and the second video frame.

7. The video frame processing method of claim 6, wherein a time point of the first video frame is prior to or after a time point of the second video frame.

8. The video frame processing method of claim 6, wherein the first camera and the second camera are configured operate at a same video frame rate.

9. A video frame processing method, comprising:
   capturing first video frames using a first camera;
   capturing second video frames using a second camera; and
   for one of the first video frames, generating a corresponding target video frame that is non-stereoscopic and corresponds to a viewing perspective of the one of the first video frames, including:
      selecting the one of the first video frames as the corresponding target video frame when image quality of the one of the first video frames is better than a quality threshold; and
      generating the corresponding target video frame when the image quality of the one of the first video frames is not better than the quality threshold, including
         interpolating the one of the first video frames and another one of the first video frames to generate a third video frame, and
         adjusting one of the second video frames based the third video frame to generate the corresponding target video frame.

10. The video frame processing method of claim 9, wherein the one of the first video frames and the one of the second video frames are simultaneously captured.

11. The video frame processing method of claim 10, wherein the first video frames and the second video frames have a same video frame rate.

12. The video frame processing method of claim 1, wherein the first video frames and the second video frames are interleavingly captured.

13. The video frame processing method of claim 12, wherein the first video frames and the second video frames have a same video frame rate.

* * * * *